(12) United States Patent
Tomiuga et al.

(10) Patent No.: US 8,251,355 B2
(45) Date of Patent: Aug. 28, 2012

(54) FRONT FORK

(75) Inventors: Takeshi Tomiuga, Tokyo (JP); Yasuhiro Kitamura, Tokyo (JP); Yuki Amano, Tokyo (JP); Masato Kobayashi, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 678 days.

(21) Appl. No.: 12/385,695

(22) Filed: Apr. 16, 2009

(65) Prior Publication Data

US 2009/0261555 A1     Oct. 22, 2009

(30) Foreign Application Priority Data

Apr. 17, 2008  (JP) ................................. 2008-107415
Mar. 27, 2009  (JP) ................................. 2009-078619

(51) Int. Cl.
    *F16F 5/00* (2006.01)
(52) U.S. Cl. ...................... 267/64.26; 188/312; 188/315
(58) Field of Classification Search ............... 267/64.26, 267/64.11, 221; 188/312, 313, 314, 315, 188/316–318, 281, 284–287, 322.17; 280/124.1, 280/124.108, 124.109
    See application file for complete search history.

(56) References Cited

U.S. PATENT DOCUMENTS

| | | | | |
|---|---|---|---|---|
| 2,253,190 | A * | 8/1941 | Mistral | 280/124.106 |
| 2,771,968 | A | 11/1956 | Mercier | |
| 3,966,030 | A * | 6/1976 | Sirven | 188/318 |
| 4,280,600 | A * | 7/1981 | Salmon et al. | 188/312 |
| 5,316,272 | A | 5/1994 | Davis | |
| 6,971,493 | B2 * | 12/2005 | Yoshimoto | 188/312 |
| 7,575,110 | B2 * | 8/2009 | Yoshimoto | 188/312 |
| 2009/0038897 | A1 * | 2/2009 | Murakami | 188/266.5 |

FOREIGN PATENT DOCUMENTS

JP    2004-293660 A    10/2004

* cited by examiner

*Primary Examiner* — Pamela Rodriguez
(74) *Attorney, Agent, or Firm* — Rabin & Berdo, P.C.

(57) ABSTRACT

A suspension spring and a double-rod damper are installed in the interior of a front fork which comprises a body-side tube and a wheel-side tube. The double-rod damper comprises a piston housed in a cylinder, and an upper rod and a lower rod connected to the piston. The upper rod is formed to have a smaller diameter than the lower rod. By providing an orifice which allows working oil in an upper oil chamber formed around the upper rod to flow into a reservoir while causing the pressure in the upper oil chamber to increase, expansion and contraction of air bubbles mixed into working oil in the cylinder is prevented, thereby improving the response of a damping force generated in the front fork.

13 Claims, 13 Drawing Sheets

FRONT FORK

FIELD OF THE INVENTION

This invention relates to an improvement in the response of a front fork for a motorcycle incorporated with a double-rod damper.

BACKGROUND OF THE INVENTION

JP2004-293660A published by the Japan Patent Office in 2004 (Japanese Patent Serial Number 3873192) proposes a front fork interposed between a front wheel and a vehicle body of a motorcycle for absorbing oscillations input into the front wheel from the road surface.

This front fork comprises a body-side tube that is connected to a handlebar of the motorcycle and fitted onto an outer circumference of a wheel-side tube connected to a front wheel axis of the same. The front fork incorporates a double-rod damper in the interior thereof.

The double-rod damper comprises a cylinder fixed in the wheel-side tube, a piston housed in the cylinder, an upper rod connected to an upper end of the piston, and a lower rod connected to a lower end of the piston. The interior of the cylinder is divided by the piston into an upper oil chamber and a lower oil chamber. These oil chambers are filled with working oil. An upper end of the upper oil chamber is closed by an upper partition, and a lower end of the lower oil chamber is closed by a lower partition.

The upper rod protrudes upward from the upper partition and is connected to an upper end of the body-side tube. The lower rod protrudes downward from the lower partition. An elongation/contraction space for the lower rod projecting from the lower partition is provided in the cylinder. The upper rod and the lower rod are formed to have an identical diameter. A suspension spring is interposed between the upper partition and the upper end of the body-side tube.

The upper oil chamber and the lower oil chamber communicate with each other via a damping valve installed in the piston. Further, a reservoir of working oil is provided in the interior of the body-side tube above the upper partition.

A space between the cylinder and the wheel-side tube is connected to the reservoir via a notch formed in the upper partition. Further, the elongation/contraction space of the lower rod under the lower partition is also connected to the space between the cylinder and the wheel-side tube via a notch formed in the lower end of the cylinder. These spaces are filled with working oil so as to function as a part of the reservoir.

A check valve is provided in the lower partition to allow working oil to flow from the reservoir into the lower oil chamber. Further, an air vent that connects the space between the cylinder and the wheel-side tube to the upper oil chamber is formed in an upper wall of the cylinder.

To fill the front fork with working oil when it is assembled, working oil is first poured into the reservoir and the front fork is then caused to elongate and contract. This operation makes working oil flow into the lower oil chamber from the reservoir via the check valve in the lower partition, and flow into the upper oil chamber via the damping valve. Air remaining in these oil chambers is then expelled to the outside of the cylinder from the air vent as working oil flows into the oil chambers.

SUMMARY OF THE INVENTION

The air vent expels air above the oil surface in the cylinder to the outside of the cylinder when the cylinder is filled with working oil, but does not expel air bubbles mixed in the working oil. Accordingly, in the front fork constructed as described above, air bubbles inevitably remain in the upper oil chamber and the lower oil chamber in a service state.

When the front fork elongates or contracts, the pressure in the upper oil chamber or the lower oil chamber decreases in response to a displacement of the piston in a direction within the cylinder and the air bubbles in the oil chamber in which the pressure has decreased begin to expand. Thereafter, when the pressure in the oil chamber begins to increase in response to a displacement of the piston in the opposite direction within the cylinder, the air bubbles in the oil chamber begin to contract.

When one of the upper oil chamber and the lower oil chamber shifts from a low pressure to a high pressure in response to a displacement of the piston, the other oil chamber shifts from a high pressure to a low pressure. In accordance with this pressure variation, working oil moves from the high-pressure chamber to the low-pressure chamber via the damping valve, thereby generating a damping force.

In the oil chamber that shifts from a low pressure to a high pressure, air bubbles that have expanded due to the low pressure begin to contract. This volume variation in the air bubbles brings about a delay in the pressure increase in the oil chamber that should occur in response to the displacement of the piston. As a result, the movement of working oil from the high-pressure chamber to the low-pressure chamber via the damping valve is also delayed. During this delay period, the damping valve cannot generate a damping force.

The delay in the generation of damping force with respect to the displacement of the piston may cause the riding comfort of the motorcycle to deteriorate.

It is therefore an object of the invention to prevent a delay from occurring in the generation of damping force by the damping valve when one of the upper oil chamber and the lower oil chamber shifts from a low pressure to a high pressure, thereby increasing a response of a front fork.

To achieve the above object, this invention provides a front fork disposed between a frame and a front wheel of a motorcycle, comprising a body-side tube connected to the frame so as to face downward, a wheel-side tube connected to the front wheel so as to face upward and fitted to the body-side tube so as to be free to slide relative thereto, and a double-rod damper.

The double-rod damper comprises a cylinder fixed within the wheel-side tube and filled with working oil, a piston accommodated in the cylinder so as to be free to slide axially, an upper rod fixed to an upper end of the piston, and a lower rod fixed to a bottom end of the piston and projecting axially downward from the cylinder into the wheel-side tube. The upper rod projects axially upward from the cylinder and is connected to the body-side tube.

The lower rod has a different diameter to the upper rod.

An upper oil chamber is formed by the piston in the cylinder around the upper rod, and a lower oil chamber is formed by the piston in the cylinder around the lower rod. The double-rod damper further comprises a damping member which allows working oil to flow between the upper oil chamber and the lower oil chamber under a predetermined flow resistance, a reservoir of working oil disposed on the outside of the cylinder, and a passage which connects one of the upper oil chamber and the lower oil chamber formed around one of the upper rod and the lower rod which has a greater diameter, to the reservoir, and causes a pressure in the one of the upper oil chamber and the lower oil chamber to increase when the piston displaces in the cylinder in a direction that causes a working oil amount in the cylinder to decrease.

The details as well as other features and advantages of this invention are set forth in the remainder of the specification and are shown in the accompanying drawings.

DESCRIPTION OF THE PREFERRED EMBODIMENTS

Figure 1:
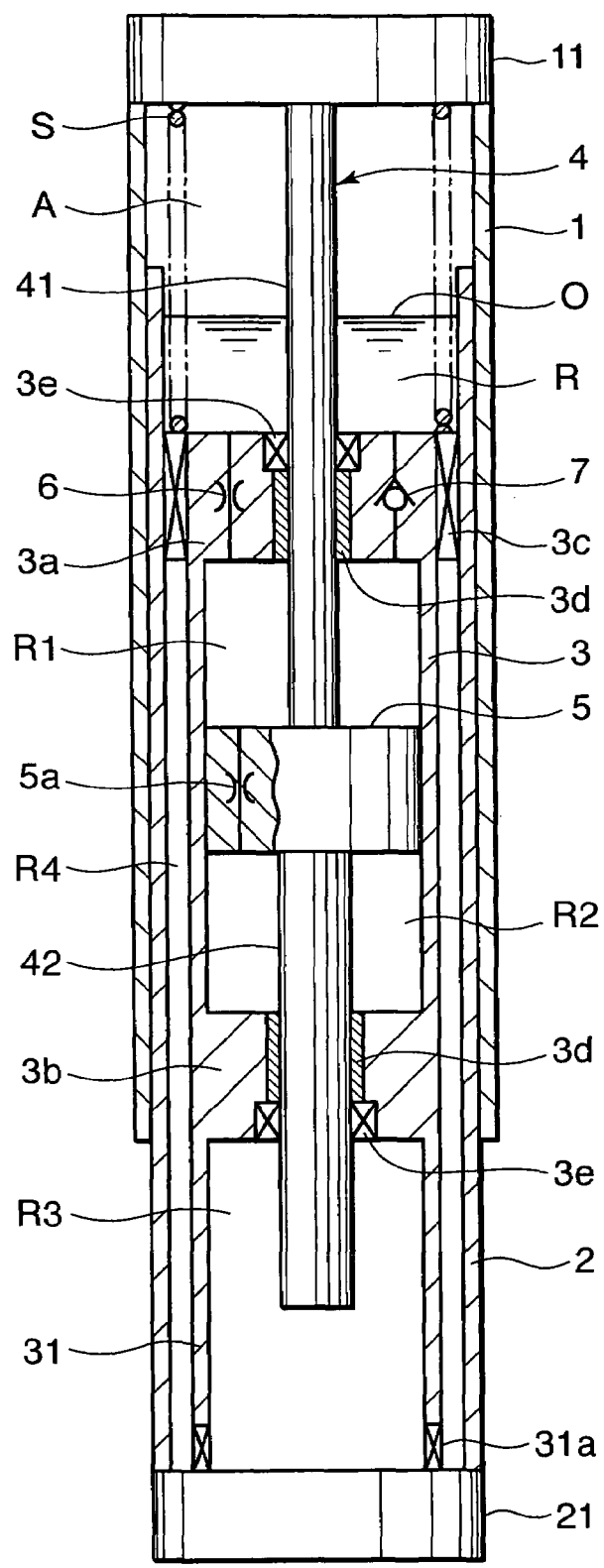
FIG. 1 is a schematic longitudinal sectional view of a front fork according to this invention.

Referring to FIG. 1 of the drawings, a front fork according to this invention is interposed between a front wheel and a vehicle body of a motorcycle to suppress oscillation due to undulation of a road surface, as is basically the case in the front fork according to the aforesaid prior art. The front fork is a so-called inverted type front fork that comprises a body-side tube 1 opening downward and a wheel-side tube 2 that is fitted onto the inner periphery of the body-side tube 1 from the lower side.

The front fork houses a suspension spring S which is interposed between the body-side tube 1 and the wheel-side tube 2 so as to push the body-side tube 1 and the wheel-side tube 2 in a direction to be detached from each other and a double-rod damper D.

The body-side tube 1 is connected to a vehicle body of the motorcycle, or more precisely to a handlebar thereof, via an upper bracket. The wheel-side tube 2 is connected to a front wheel axis of the motorcycle via a lower bracket. Accordingly, by operating the handlebar, the front wheel is steered via the front fork. When oscillation caused by undulation of the road surface is input into the front fork from the front wheel, the front fork elongates and contracts so as not to transmit the oscillation to the vehicle body.

The double-rod damper D comprises a cylinder 3 disposed coaxially in the wheel-side tube 2, a piston 5 housed in the cylinder 3 so as to be free to slide axially, an upper rod 41 fixed to an upper end face of the piston 5, and a lower rod 42 fixed to a lower end face of the piston 5. The interior of the cylinder 3 is divided into an upper oil chamber R1 and a lower oil chamber R2 by the piston 5. The upper rod 41 is formed to have a smaller diameter than the lower rod 42, or in other words a pressure receiving area of the piston 5 in the upper oil chamber R1 is set to be greater than a pressure receiving area of the piston 5 in the lower oil chamber R2.

An upper end of the upper oil chamber R1 is delimited by an upper partition 3a provided at an upper end of the cylinder 3. A lower end of the lower oil chamber R2 is delimited by a lower partition 3b that is provided in a lower part of the cylinder 3.

The upper rod 41 penetrates the upper partition 3a upwardly so as to be free to slide via a bushing 3d and a seal member 3e. An upper end of the upper partition 3a is connected to a cap member 11 that closes an upper end of the body-side tube 1.

The suspension spring S is interposed between the cap member 11 and the upper partition 3a. A space formed between the cap member 11 and the upper partition 3a in the front fork is used as a reservoir R in which working oil and air are enclosed. The upper partition 3a protrudes radially outward from the upper end of the cylinder 3 and contacts the inner periphery of the wheel-side tube 2. A notch 3c is formed in a projecting portion of the upper partition 3a that projects to the outside of the cylinder 3. The notch 3c connects the reservoir R to a ring-shaped space R4 formed between the wheel-side tube 2 and the cylinder 3.

The wheel-side tube 2 comprises a bottom 21 and a lower end of the cylinder 3 is fixed to the bottom 21. A space R3 formed under the lower partition 3b in the cylinder 3 is connected to the ring-shaped space R4 on the outside of the cylinder 3 via a communicating hole 31a formed in a lower end portion of the cylinder 3. By thus communicating with each other, the reservoir 6 and the spaces R4 and R3 form an enlarged reservoir. The total working oil amount in the reservoir R and the spaces R3, R4 is determined in advance such that an oil surface O is located above the upper partition 3a. Air enclosed above the oil surface O functions as an air spring so as to exert a resilient force on the front fork in an elongation direction.

The lower rod 42 penetrates the lower partition 3b downwardly so as to be free to slide via a bushing 3d and a seal member 3e, and the lower end of the lower rod 42 reaches the space R3.

An orifice 5a connecting the upper oil chamber R1 and the lower oil chamber R2 is installed in the piston 5. The orifice 5a functions as a damping member which allows working oil to flow there-through while generating a damping force whether the working oil flows from the upper oil chamber R1 to the lower oil chamber R2 or from the lower oil chamber R2 to the upper oil chamber R1.

An orifice 6 is installed in the upper partition 3a to connect the upper oil chamber R1 and the reservoir R. The orifice 6 functions as a passage which allows a part of the working oil in the upper oil chamber R1 to flow into the reservoir R while causing the pressure in the upper oil chamber R1 to increase when the upper oil chamber R1 decreases in size as the piston 5 strokes upward in the cylinder 3. The flow resistance of the orifice 6 is set to be greater than that of the orifice 5a.

A check valve 7 which allows working oil to flow from the reservoir R to the upper oil chamber R1 without resistance but prevents working oil from flowing in the opposite direction is installed in the upper partition 3a in parallel with the orifice 6.

It should be noted that although the lower end of the cylinder 3 is fixed to the bottom 21 in this embodiment, the upper partition 3a may be fixed to the wheel-side tube 2 and the cylinder 3 may be hung from the upper partition 3a without fixing the lower end of the cylinder 3 to the bottom 21. Such a construction is preferable in view of decreasing stress in the double-rod damper D when a bending load is exerted on the front fork.

Since working oil exists on both sides of the upper partition 3a, the seal member 3e provided in the upper partition 3a may be omitted. Since working oil exists on both sides of the lower partition 3b, the seal member 3e provided in the lower partition 3b may also be omitted.

By omitting the seal members 3e, the number of parts can be decreased, and the upper rod 41 and the lower rod 42 require no surface finishing. Therefore, the manufacturing cost of the front fork can be reduced.

When the front fork elongates, the upper oil chamber R1 decreases in size and the lower oil chamber R2 enlarges in the double-rod damper D. A part of the working oil in the upper oil chamber R1 then flows into the lower oil chamber R2 via the orifice 5a while generating an elongation damping force. However, the working oil amount in the oil chambers R1 becomes surplus due to the difference in the diameters of the upper rod 41 and the lower rod 42. Working oil corresponding to the surplus amount is expelled from the upper oil chamber R1 to the reservoir R through the orifice 6. Since the flow resistance of the orifice 6 is set to be greater than that of the orifice 5a, the pressure in the upper oil chamber R1 increases as working oil flows out from the orifice 6.

Simultaneously, a part of working oil in the upper oil chamber R1 flows into the lower oil chamber R2 via the orifice 5a. When the pressure in the upper oil chamber R1 increases according to the flow resistance of the orifice 6, the pressure in the lower oil chamber R2 also increases. Accordingly, a condition in which air bubbles mixed into working oil in the lower oil chamber R2 are unlikely to expand is achieved.

When the front fork shifts from elongation to contraction, the upper oil chamber R1 enlarges and the lower oil chamber R2 decreases in size in the double-rod damper D. In this state, since the air bubbles mixed into the working oil in the lower oil chamber R2 have not expanded as described above, the air bubbles do not contract even when the pressure is increased in the lower oil chamber R2. Therefore, the working oil in the lower oil chamber R2 immediately flows into the upper oil chamber R1 via the orifice 5a while generating a contraction damping force.

The working oil amount in the oil chambers R1 becomes deficit due to the difference in the diameters of the upper rod 41 and the lower rod 42. Working oil corresponding to the deficit amount is introduced from the reservoir R into upper oil chamber R1 via the check valve 7 without resistance. The upper oil chamber R1 therefore does not fall into a negative pressure, and the upper oil chamber R1 maintains a condition in which the air bubbles mixed into the working oil are unlikely to expand.

It should be noted that the inflow amount of working oil into the upper oil chamber R1 from the reservoir R corresponds to the difference in the diameters of the upper rod 41 and the lower rod 42 and is small. Accordingly, the air existing above the oil surface O in the reservoir R is not mixed into the working oil which flows from the reservoir R into the upper oil chamber R1 via the check valve 7.

As described above, this front fork comprises the upper rod 41 having a smaller diameter than the lower rod 42 and the orifice 6 which allows working oil from the upper oil chamber R1, which is formed around the upper rod 41 having a smaller diameter, into the reservoir R while increasing the pressure in the upper oil chamber R1. As a result, when the upper oil chamber R1 decreases in size, the pressure in the cylinder increases as a whole, and expansion of the air bubbles in the cylinder 3 is suppressed. Accordingly, when the operation direction of the front fork-shifts, a delay in damping force generation by the orifice 5a due to a contraction of the air bubbles which have expanded in the cylinder 3 does not occur and the front fork generates a damping force within a better response than the front fork according to the aforesaid prior art.

The delay in the damping force generation in the orifice 5 due to contraction/expansion of the air bubbles mixed into the working oil appears more notably as the front fork operates at a higher speed. The prevention effect of the delay in the damping force generation according to this invention is also more notable when the front fork operates at a higher speed.

According to this front fork, therefore, a predetermined damping force can actually be generated at a predetermined timing.

In this embodiment, by providing the notch 3c in the upper partition 3a, the spaces R4 and R3 are used as a part of the reservoir R, but it is also possible to intercept the connection between the spaces R4, R3 and the reservoir R by providing a seal member between the outer periphery of the upper partition 3a and the inner periphery of the wheel-side tube 2. In this case, since the working oil amount in the reservoir R decreases by a large amount, the front fork can be made light-weight. However, the seal member 3e in the lower partition 3b becomes essential.

Various variations are possible in this embodiment.

For example, it is possible to omit the cylinder 3 such that the piston 5 is directly housed in the wheel-side tube 2 so as to be free to slide axially. In other words, the wheel-side tube 2 may be used to function as the cylinder 3.

This invention is not limited to a front fork of an inverted type, but can be applied to a front fork of an upright type in which the body-side tube 1 is inserted into the wheel-side tube 2 so as to be free to slide axially.

Next, referring to FIGS. 2-6 a second embodiment of this invention will be described. The first embodiment shown in FIG. 1 is an embodiment related to a basic structure of a front fork, and hence, certain omissions have been made.

In contrast, the second embodiment is an embodiment related to a real shape and structure of a front fork. The basic structure of the front fork according to the first embodiment shown in FIG. 1 and that of the front fork according to the second embodiment shown in FIGS. 2-6 are similar, but differ in detail.

In the description of the second embodiment, identical parts to those of the first embodiment are represented by identical reference symbols and the description of these parts is thereby omitted.

Figure 2:
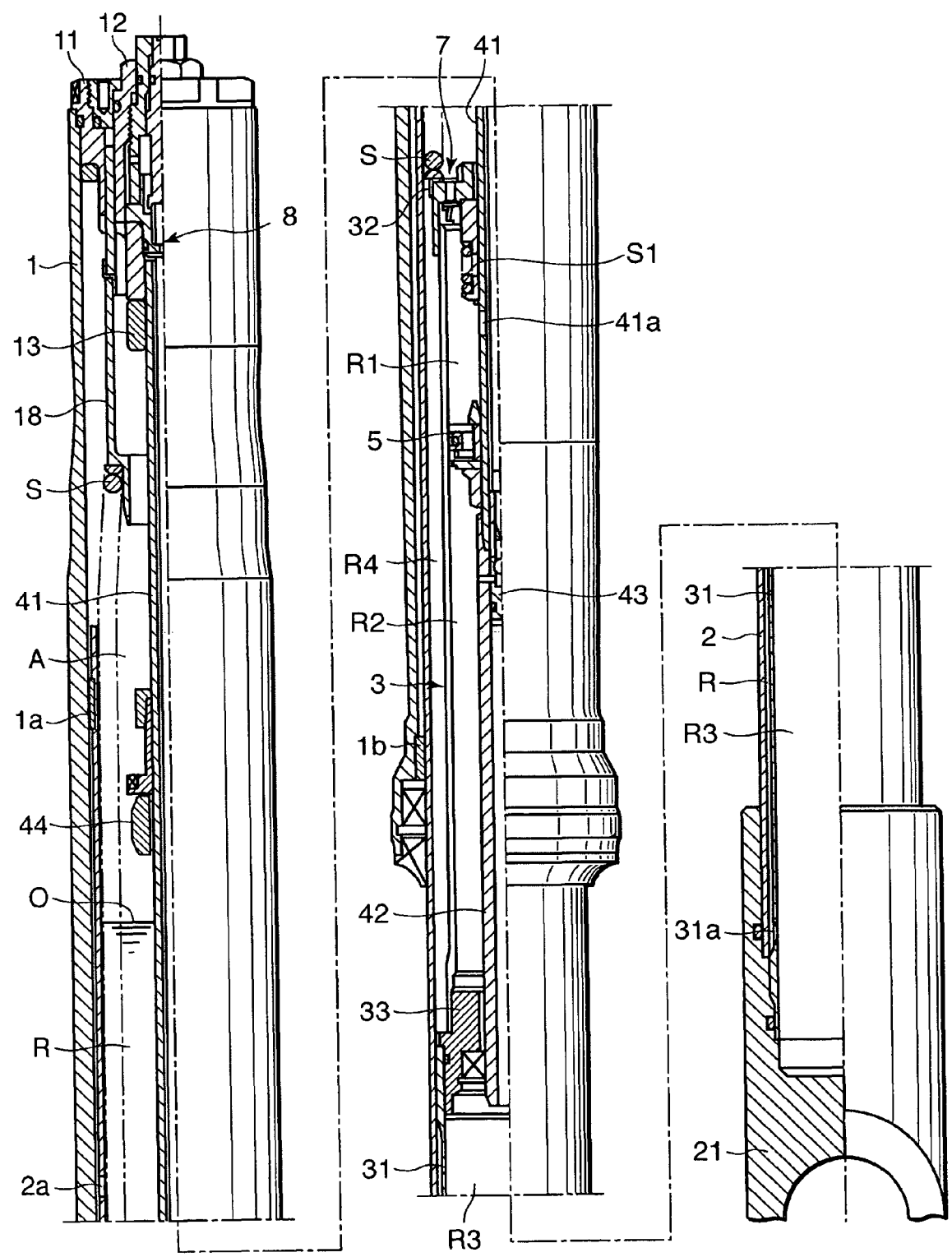
FIG. 2 is a detailed longitudinal sectional view and a side view of a front fork according to a second embodiment of this invention.
Figure 4:
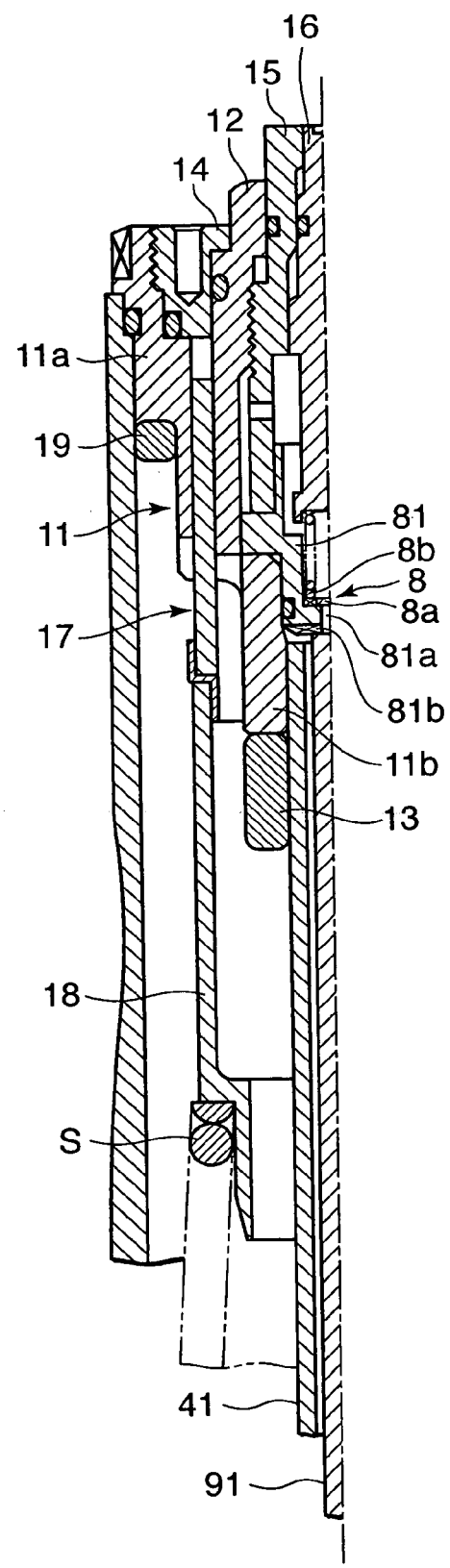
FIG. 4 is an enlarged longitudinal sectional view of a part of the front fork in the vicinity of an upper end according to the second embodiment of this invention.

Referring to FIGS. 2 and 4, in this front fork, the cap member 11 that closes an upper end opening of the body-side tube 1 comprises an outer adjuster 12. The outer adjuster 12 regulates a spring load of the suspension spring S in response to a turning operation from the outside.

Figure 3:
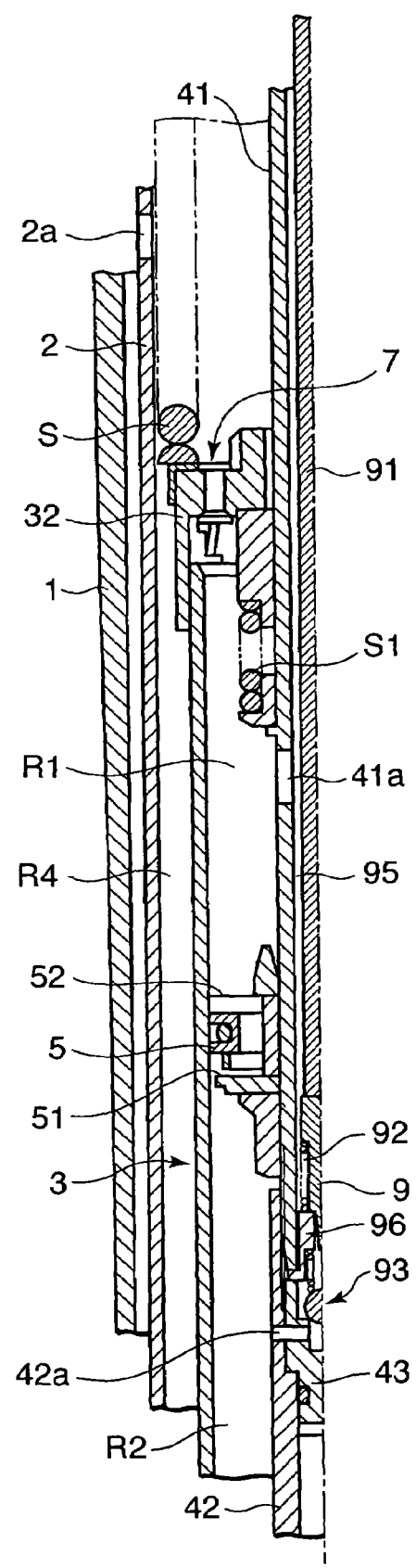
FIG. 3 is an enlarged longitudinal sectional view of a part of the front fork in the vicinity of an upper partition according to a second embodiment of this invention.

Referring to FIG. 3, the damping member disposed between the upper oil chamber R1 and the lower oil chamber R2 is constituted by an elongation damping valve 51 and a contraction damping valve 52 which have a similar effect to the orifice 5a of the first embodiment.

Referring to FIG. 2, a pair of bearings 1a and 1b are provided on the inner periphery of the body-side tube 1 at locations spaced from each other in an axial direction. The bearings 1a and 1b support the outer periphery of the wheel-side tube 2. A hole 2a is formed through an upper part of the wheel-side tube 2 to connect the interior and the exterior of the wheel-side tube 2. The hole 2a has a function to lubricate the sliding surface between the wheel-side tube 2 and the body-side tube 1 using working oil in the reservoir R so as to ensure smooth sliding therebetween. The hole 2a is formed between the bearings 1a and 1b.

According to this embodiment, a rod guide 32 is provided to serve as the upper partition 3a of the first embodiment. A gap is formed between the rod guide 32 and the cylinder 3 on the outside thereof instead of the notch 3c of the first embodiment so as to allow working oil to flow between the reservoir R and the space R4. A bump cushion 44 is fixed to the upper rod 41. The bump cushion 44 contacts the rod guide 32 from above so as to prevent the front fork from contracting further, when the front fork reaches a contraction limit.

Also according to this embodiment, a rod guide 33 is provided to serve as the lower partition 3b of the first embodiment. The cylinder 3 according to the first embodiment extends further downward from the lower partition 3b to reach the bottom 21. According to this embodiment, a sub-cylinder 31 having a greater diameter than the cylinder 3 and projecting downward is fixed to the rod guide 33. The lower end of the sub-cylinder 31 is fixed to the bottom 21.

Referring to FIG. 4, a cushion member 19 is held by the sub-cylinder 31. The cushion member 19 contacts the upper end of the wheel-side tube 2 so as to absorb an impact when the front fork reaches the contraction limit.

The upper rod 41 and the lower rod 42 are respectively constructed from a hollow pipe material. By using a hollow pipe material, a section modulus of the rod is increased such that the mechanical strength of the upper rod 41 and the lower rod 42 is enhanced. Further, constructing the upper rod 41 and the lower rod 42 from a pipe material brings about another effect of reducing the weight of the front fork.

Referring to FIGS. 2 and 3, a plug 43 is press-fitted into the lower rod 42, which opens onto the space R3 so as to shut off the connection between the space R3 and the air existing above the oil surface O in the reservoir R.

Referring again to FIG. 3, hole 41a is formed in the wall of the upper rod 41 to connect the interior and the exterior thereof in a position not affected by the rod guide 32 even when the front fork reaches an elongation limit. The hole 41a connects the upper oil chamber R1 and the reservoir R via a space in the upper rod 41.

Referring again to FIG. 4, an upper end of the upper rod 41 is screwed into the cap member 11. The cap member 11 comprises an upper half 11a and a lower half 11b. The outer periphery of the upper half 11a is screwed into the inner periphery of the upper end of the body-side tube 1. An outer periphery of the upper end of the upper rod 41 is screwed into the inner periphery of the lower half 11b. A lock nut 13 is secured onto the outer periphery of the upper rod 41 so as to prevent a screw connection between the lower half 11b and the upper rod 41 from coming loose.

Referring again to FIG. 3, a lower end of the upper rod 41 penetrates the piston 5 so as to project downward. The piston 5 is screwed onto the outer periphery of the lower end of the upper rod 41. The inner periphery of an upper end of the lower rod 42 is screwed onto the outer periphery of a downward projecting portion of the upper rod 41.

Referring again to FIG. 4, the upper oil chamber R1 is connected to a space in the upper rod 41 via the hole 41a formed in the upper rod 41.

The space in the upper rod 41 is connected to the reservoir R via an inner space in the upper half 11a of the cap member 11. A relief valve 8 is installed in the inner space of the upper half 11a.

The relief valve 8 regulates a working oil amount that passes through the elongation damping valve 51 when the front fork elongates. The relief valve 8 also functions as a passage, which allows working oil to flow from the upper oil chamber R1 to the reservoir R while increasing the pressure in the upper oil chamber R1 as in the case of the orifice 6 of the first embodiment shown in FIG. 1.

A middle adjuster 15 is screwed into the inner periphery of the outer adjuster 12 in the cap member 11. Further, an inner adjuster 16 is screwed into the inner periphery of the middle adjuster 15 so as to be free to rotate relative to the middle adjuster 15.

When the inner adjuster 16 is turned from the outside with respect to the middle adjuster 15, the inner adjuster 16 displaces axially with respect to the middle adjuster 15. The relief valve 8 comprises a valve body 8a and a spring 8b that biases the valve body 8a towards a closed position. Since an end of the spring 8b is supported by the inner adjuster 16, when a turning operation of the inner adjuster 16 is performed, a supporting position of the spring 8b displaces and the relief pressure of the relief valve 8 varies.

Figure 5:
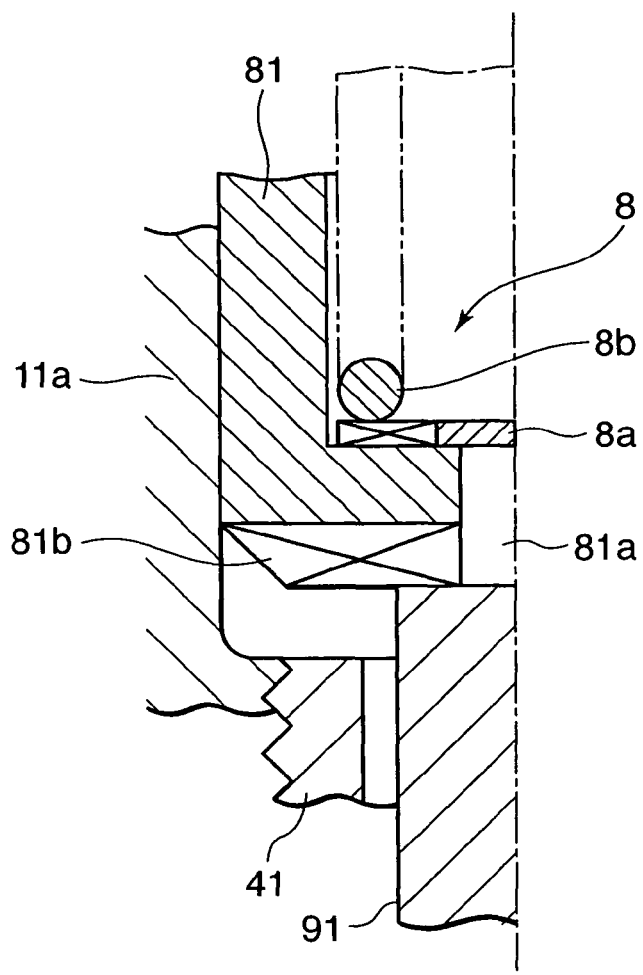
FIG. 5 is a longitudinal sectional view of a relief valve provided in the front fork according to the second embodiment of this invention.
Figure 6:
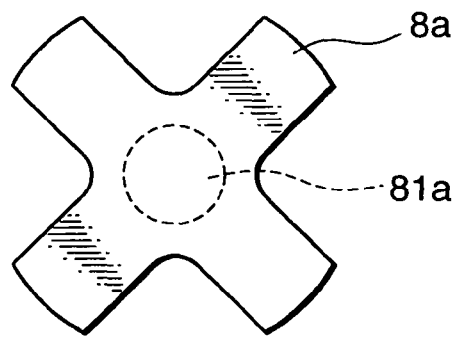
FIG. 6 is a plan view of the relief valve.

Referring to FIGS. 5 and 6, the relief valve 8 comprises a valve body 8a having a cruciate plan form, a cylindrical seat member 81 having a bottom, and a spring 8b which biases the valve body 8a towards the seat member 81. A vertical hole 81a is formed in the center of the seat member 81 and the valve body 8a biased by the spring 8b is arranged to be seated on the seat member 81 to close the vertical hole 81 a from above.

The vertical hole 81a is connected to the inner space of the upper rod 41 via a notch 81b formed on the under side of the seat member 81. When the pressure in the inner space of the upper rod 41 exceeds the relief pressure of the relief valve 8, the relief valve 8 lifts the valve body 8a from the seat member 81 so as to allow working oil in the upper oil chamber R1 to flow into the reservoir R. Simultaneously, the relief valve 8 generates a damping force that is greater than that of the elongation damping valve 51. The relief pressure of the relief valve 8 can be regulated as desired by altering the spring load of the spring 80 through a turning operation of the inner adjuster 16.

By regulating the spring load of the spring 80 in this way, the relief valve 8 operates not only when the stroke speed of the piston 5 is greater than a middle speed region, but also when it is in an extremely low speed region to a low speed region. The relief valve 8 may be replaced by different types of valves such as a poppet valve as long as they have a function to allow the working oil in the upper chamber R1 to flow into the reservoir R when the pressure in the upper chamber R1 exceeds a predetermined cracking pressure.

Referring again to FIG. 3, the check valve 7 is installed in the rod guide 32 that functions as the upper partition 3a.

Referring again to FIG. 4, the outer adjuster 12 in this front fork functions as described below.

Specifically, when the outer adjuster 12 is turned, a pusher 17 screwed onto the outer periphery of the outer adjuster 12 move up and down with respect to the cap member 11. The pusher 17 supports an upper end of the suspension spring S via a spacer 18, thereby altering the position of the upper end of the suspension spring S so as to regulate the spring load of the suspension spring S.

According to this embodiment, a damping force generated by the contraction damping valve 52 can be regulated through a turning operation of the middle adjuster 15.

Referring again to FIG. 3, the inner space of the upper rod 41 is utilized as a bypass passage 95 which bypasses the contraction damping valve 52 to connect the lower oil chamber R2 and the upper oil chamber R1. A control valve 9 is installed in the bypass passage 95. For this purpose, a hole 42a is formed to penetrate a screwed part between the lower rod 42 and the upper rod 41 so as to connect the lower oil chamber R2 and the bypass passage 95. The upper rod 41 is provided with the hole 41a that connects the upper oil chamber R1 and the inner space of the upper rod 41 as described above. The bypass passage 95 is connected to the upper oil chamber R1 via the hole 41a. The plug 43 is press-fitted into the lower rod 43 under the hole 42a.

The control valve 9 comprises a needle valve facing the bypass passage 95. A valve seat 96 having a ring-shaped cross-section is provided on the inner periphery of the lower end of the upper rod 41 so as to cause the control valve 9 to be seated thereon. The control valve 9 is supported downwardly by a control rod 91 that is inserted into the upper rod 41 from above. Meanwhile, a spring 92 is interposed between the valve seat 96 and the control valve 9 so to bias the control valve 9 upward.

Referring to FIG. 5, an upper end of the control rod 91 contacts the seat member 81 of the relief valve 8. The seat member 81 is fixed to the middle adjuster 15 and is driven axially as a turning operation of the middle adjuster 15 with respect to the outer adjuster 12 is performed. As a result, the control rod 91 is also driven axially.

When the seat member 81 is driven upward by performing a turning operation of the middle adjuster 15 in one direction, the control valve 9 biased by the spring 92 moves upward together with the control rod 91 such that a gap formed between the control valve 9 and the valve seat 96 widens.

In contrast, when the seat member 81 is driven downward by performing a turning operation of the middle adjuster 15 in the opposite direction, the control valve 9 is pushed by the control rod 91 and moves downward against the biasing force of the spring 92. As a result, the gap formed between the control valve 9 and the valve seat 96 narrows. When the turning operation of the middle adjuster 15 is performed with respect to the outer adjuster 12, the inner adjuster 16 rotates together with the middle adjuster 15. This operation therefore does not affect the relief pressure of the relief valve 8.

By thus performing the turning operation of the middle adjuster 15, the opening of the control valve 9 can be regulated. The control valve 9 serves as an orifice to regulate a flow amount of the bypass passage 95.

Referring again to FIG. 3, this front fork comprises a check valve 93 in series with the control valve 9 so as to prevent working oil in the upper oil chamber R1 from flowing into the oil chamber R2 via the bypass passage 95. The check valve 93 comprises a ball-shaped valve body that is provided between the hole 42a and the valve seat 96. The valve body of the check valve 9 is supported by a spring so as to allow working oil to flow into the bypass passage 95 from the lower oil chamber R2 while preventing working oil from flowing in the opposite direction.

The check valve 93 has a purpose to ensure that regulation of the opening of the control valve 9 through the turning operation of the middle adjuster 15 only varies the contraction damping force of the front fork and does not affect the elongation damping force of the front fork. The check valve 93 accomplishes this purpose by limiting the flow direction of the working oil in the bypass passage 95 to the direction extending from the oil chamber R2 to the oil chamber R1.

To prevent the construction of the contraction damping valve 52 from becoming complicated, it is preferable to regulate the contraction damping force of the front fork by regulating the opening of the control valve 9 rather than regulating the contraction damping valve 52 directly.

According to this embodiment, the spaces R3 and R4 serve as a part of the enlarged reservoir. However, also in this embodiment, the spaces R3 and R4 may be used as air chambers shut off from the reservoir R so as to make the front fork lightweight. If the spaces R3 and R4 are used as air chambers, it is preferable that a check valve that allows working oil to flow from the space R3 into the bypass passage 95 while preventing working oil from flowing in the opposite direction is installed in the bypass passage 95 in place of the plug 43, for the following reason.

When the space R3 is used as an air chamber, there is no need to connect the space R4 to the bypass passage 95 in normal operation. However, if the space R4 is filled with working oil accidentally, the working oil in the space R3 may oil-lock the invasion of the lower rod 42 in the space R3, thereby causing the front fork to malfunction. The check valve provided in the lower rod 42 in place of the plug 43 allows working oil to flow from the space R3 into to the bypass passage 95 so as to prevent the lower rod 42 invading the space R3 from being oil-locked.

Figure 7:
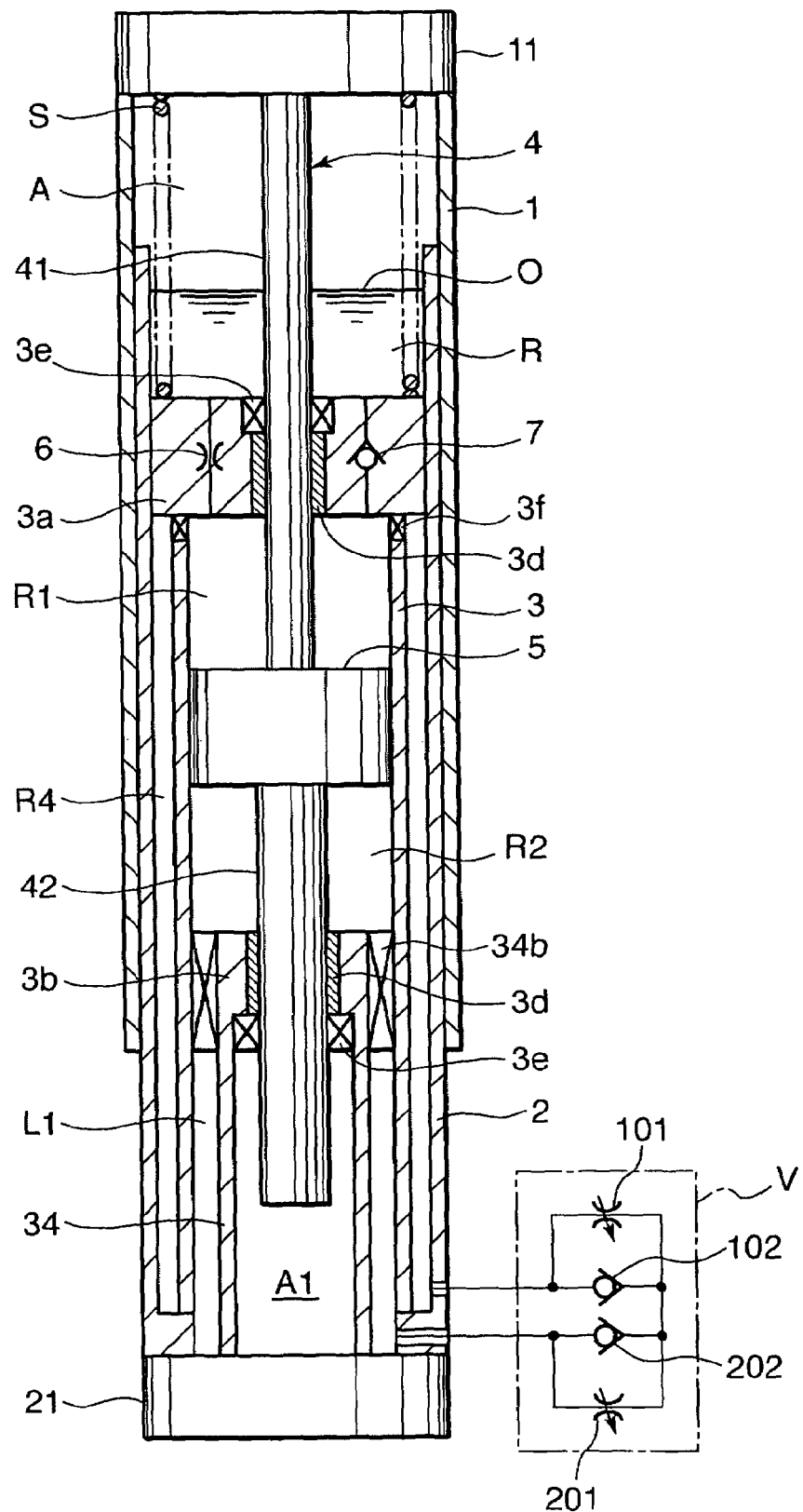
FIG. 7 is similar to FIG. 1 but shows a third embodiment of this invention.
Figure 8:
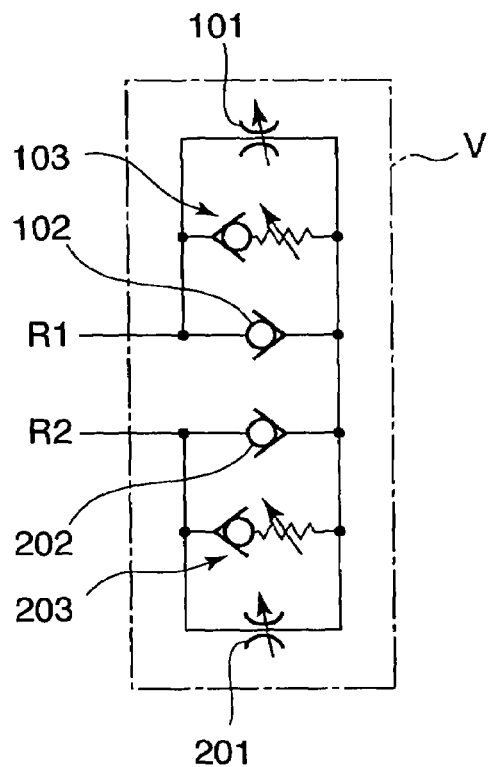
FIG. 8 is a hydraulic circuit diagram of a possible variation of a damping member according to the third embodiment of this invention.
Figure 9:
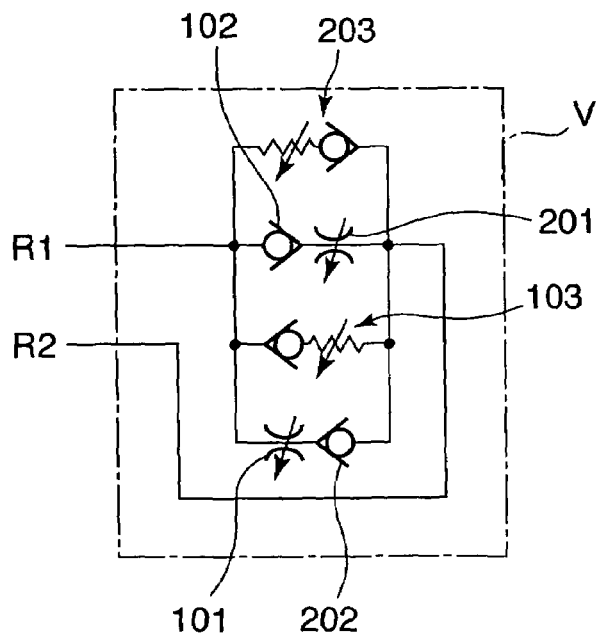
FIG. 9 is a hydraulic circuit diagram of another possible variation of a damping member according to the third embodiment of this invention.

Referring to FIGS. 7-9, a third embodiment of this invention will be described. This embodiment is an embodiment related to a basic structure of a front fork as in the case of the first embodiment.

In the description of the third embodiment, the parts identical to those of the first embodiment are represented by identical reference symbols and the description of these parts is thereby omitted.

This front fork corresponds to the front fork according to the first embodiment with the addition of an external damping mechanism V, which is provided on the outside of the front fork as a damping member that generates a damping force in response to a flow of working oil between the oil chambers R1 and R2 in place of the orifice 5a installed in the piston 5.

To alter the characteristic of a generated damping force of the damping member which generates a damping force in response to a flow of working oil between the oil chambers R1 an R2, it is possible to provide a control valve 9 in the bypass passage 95 as in the case of the second embodiment. However, to be able to alter the characteristic of the elongation damping forces and that of the contraction damping force individually, the constructions of the adjusters and the valves inevitably become complicated in order to meet this requirement.

In this embodiment, the pressure in the interior of the cylinder 3 is increased as a whole to suppress expansion of the air bubbles in the cylinder so as to prevent a delay from occurring during generation of the damping force, as in the case of the first and second embodiments. Furthermore, this embodiment aims to enable individual regulation of the elongation damping force and the contraction damping force.

In this front fork, the upper partition 3a is not provided with the notch 3c, and the space R4 between the wheel-side tube 2 and the cylinder 3 under the upper partition 3a is shut off from the reservoir R above the upper partition 3a. An upper end portion of the cylinder 3 is provided with a communicating hole 3f that connects the upper oil chamber R1 and the space R4.

Further, an inner tube 34 is provided in the interior of a lower part of the cylinder 3. The inner tube 34 connects the bottom 21 and the lower partition 3b so as to form an air chamber A1 on the inside thereof. The air chamber A1 also functions as a space for accommodating the lower rod 42 which projects downward from the lower partition 3b via the bushing 3d and the seal member 3e.

Moreover, a notch 34b is formed in the lower partition 3b on the outside of the inner tube 34 to connect a space L1 formed between the inner tube 34 and the cylinder 3 and the lower oil chamber R2.

According to the construction described above, the space R4 functions as an oil passage connected to the upper oil chamber R1, and the space L1 functions as an oil passage connected to the lower oil chamber R2.

The external damping mechanism V is provided on the outside of the front fork to connect these passages, or in other words the space R4 and the space L1 are connected to each other via the external damping mechanism V.

The external damping mechanism V has two oil paths connecting the space R4 and the space L1. In one of the oil paths, a variable orifice 101 and a check valve 202 are disposed in series. In the other oil path, a variable orifice 201 and a check valve 102 are disposed in series. The check valve 202 allows working oil to flow into the space L1 while preventing working oil from flowing in the opposite direction. The check valve 102 allows working oil to flow into the space R4 while preventing working oil from flowing in the opposite direction.

According to the construction described above, the external damping mechanism V allows either of the working oil flow form the space R4 to the space L1 via the variable orifice 101 and the check valve 202 and the working oil flow from the space L1 to the space R4 via the variable orifice 201 and the check valve 102. The former flow corresponds to the flow of working oil from the upper oil chamber R1 to the lower oil chamber R2 when the front fork elongates and the latter flow corresponds to the flow of working oil from the lower oil chamber R2 to the upper oil chamber R1 when the front fork contracts.

According to this external damping mechanism V, by regulating the opening of the variable orifice 201, the contraction damping force of the double-rod damper D can be altered without affecting the elongation damping force thereof, and by regulating the opening of the variable orifice 101, the elongation damping force of the double-rod damper D can be altered without affecting the contraction damping force.

The orifice 6 and the check valve 7 are installed in the upper partition 3a as in the case of the first embodiment. The flow resistance of the orifice 6 is set to be greater than the flow resistance of the variable orifice 101 which generates the elongation damping force so as to suppress expansion of the air bubbles mixed into the working oil and prevent a delay from occurring during generation of the damping force.

According to this embodiment, a preferable effect is obtained in preventing the air bubbles mixed into the working oil from expanding and in preventing a delay from occurring during generation of the damping force, as in the case of the first embodiment. Further, according to this embodiment, the elongation damping force and the contraction damping force of the double-rod damper D can be altered independently of each other.

According to this embodiment, the interior of the inner tube 34 is used for the air chamber A1 but it is possible to use this space as an oil chamber connected to the space L1. If this space is used as an oil chamber, the seal member 3e in the lower partition 3b can be omitted Referring to FIGS. 8 and 9, possible variations of the external damping mechanism V will be described.

The external damping mechanism V shown in FIG. 8 comprises a variable relief valve 103 disposed in parallel with the variable orifice 101 and a variable relief valve 203 disposed in parallel with the variable orifice 201. The variable relief valve 103 has a function to prevent the elongation damping force generated by the double-rod damper D from becoming excessively large when the front fork elongates at a high speed. The variable relief valve 203 has a function to prevent the contraction damping force generated by the double-rod damper D from becoming excessively large when the front fork contracts at high speed.

In the external damping mechanism V shown in FIG. 9, the variable orifice 101 and the check valve 202 are disposed in series in parallel with the variable relief valve 103,. Similarly, the variable orifice 201 and the check valve 102 are disposed in series in the external damping mechanism V in parallel with the variable relief valve 203. This variation is substantially equivalent to the variation shown in FIG. 8 in terms of functions.

Referring to FIGS. 10-14, a fourth embodiment of this invention will be described. The third embodiment shown in FIGS. 7-9 is an embodiment related to a basic structure of a front fork, and hence, certain omissions have been made.

In contrast, the fourth embodiment is an embodiment related to a real shape and structure of a front fork. The basic structure of the front fork according to the third embodiment shown in FIGS. 7-9 and that of the front fork according to the fourth embodiment shown in FIGS. 10-14 are similar, but differ in detail.

In the description of the fourth embodiment, identical parts to those of the first to third embodiments are represented by identical reference symbols, and the description of these parts is thereby omitted.

Figure 10:
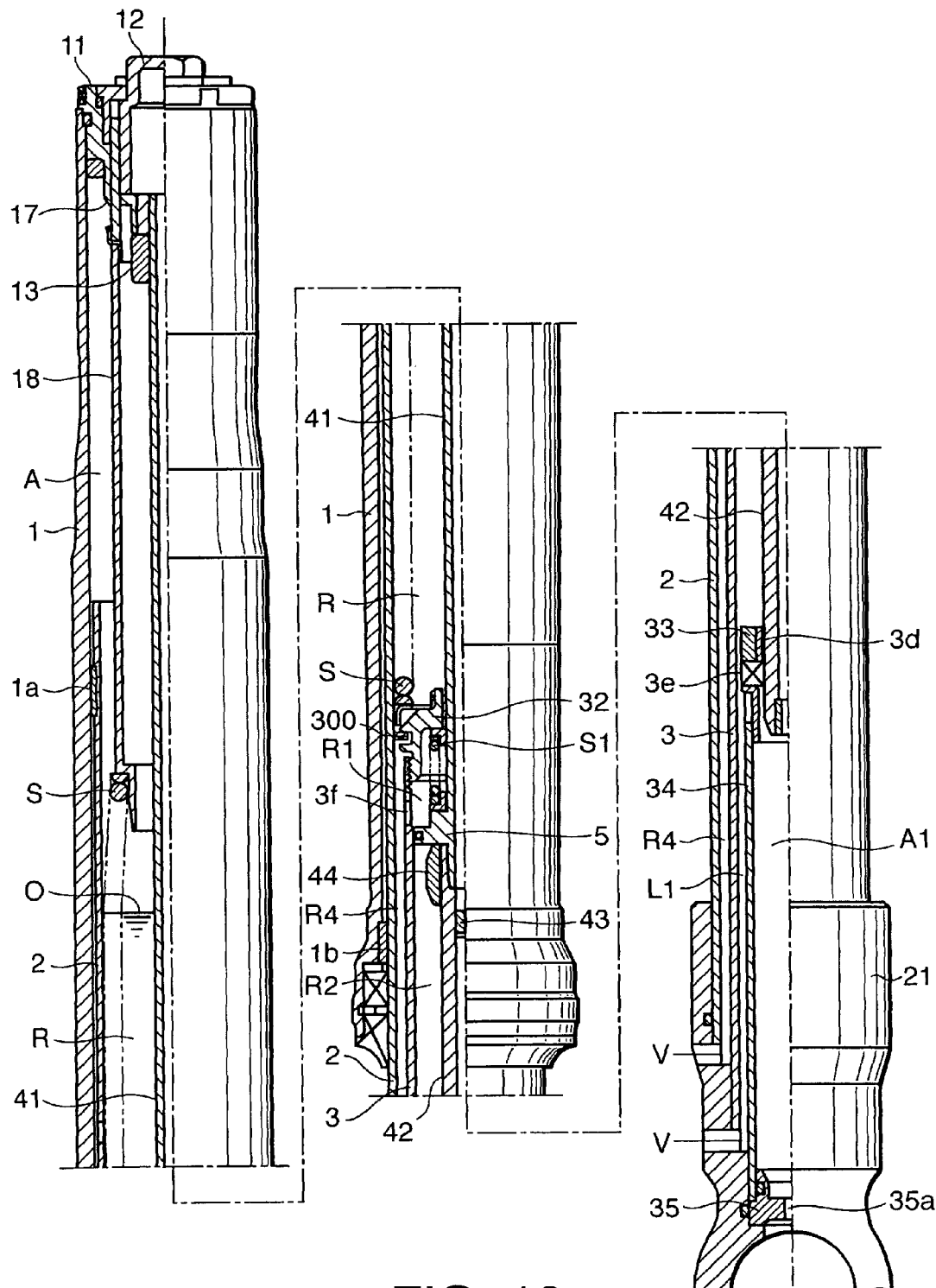
FIG. 10 is a detailed longitudinal sectional view and a side view of a front fork according to a fourth embodiment of this invention.

Referring to FIG. 10, the front fork according to this embodiment comprises the rod guide 32 as in the case of the second embodiment to serve as the upper partition 3a of the first embodiment. Unlike the second embodiment, the passage that allows working oil to flow from the upper oil chamber R1 to the reservoir R while increasing the pressure in the upper oil chamber R1 is provided in the rod guide 32. The inner tube 34 is provided between the lower partition 3b and the bottom 21 in the interior of the cylinder 3 and the interior of the inner tube 34 is used as the air chamber A1, as in the case of the third embodiment.

Figure 11:
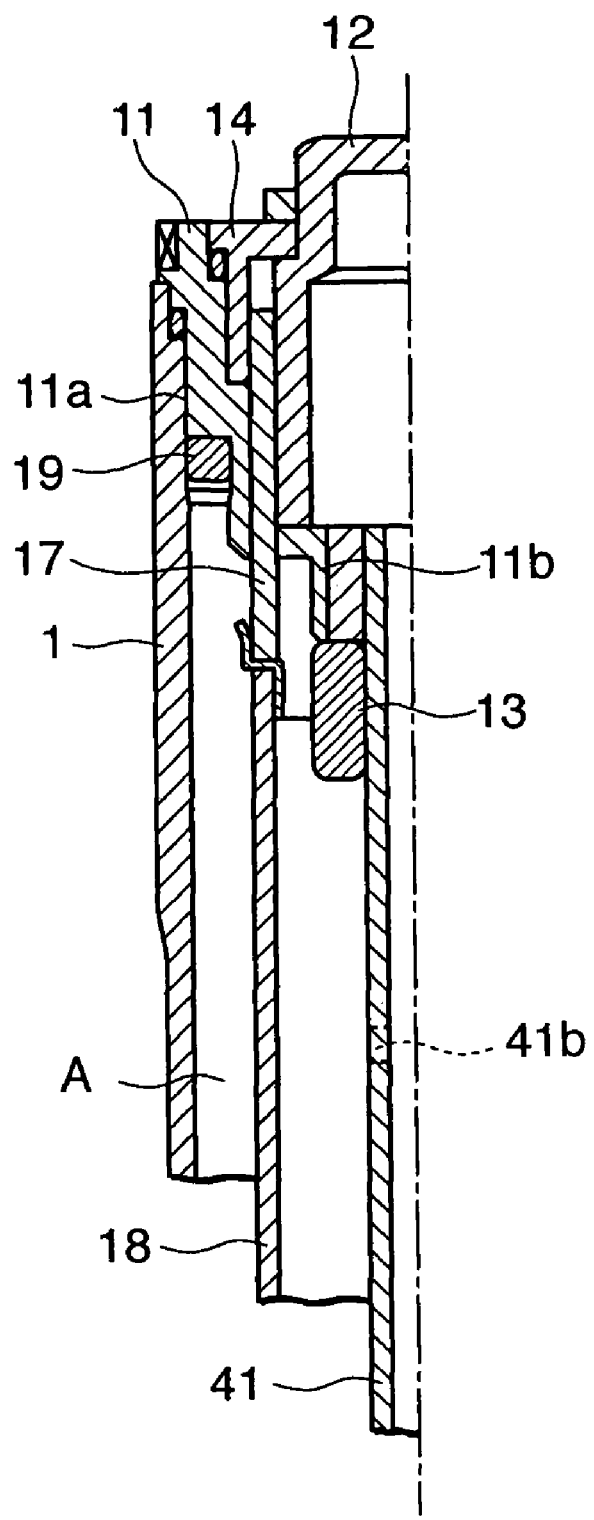
FIG. 11 is an enlarged longitudinal sectional view of an upper part of the front fork according to the fourth embodiment of this invention.

Referring to FIG. 11, the outer adjuster 12 is provided in the cap member 11 that closes the upper end opening of the t body-side tube 1 as in the case of the second embodiment. The outer adjuster 12 varies the spring load of the suspension spring S while undergoing a turning operation.

The external damping mechanism V is provided on the outside of the front fork as in the case of the third embodiment. Any variation referred to in the description of the third embodiment may be applied to the external damping mechanism V.

Figure 12:
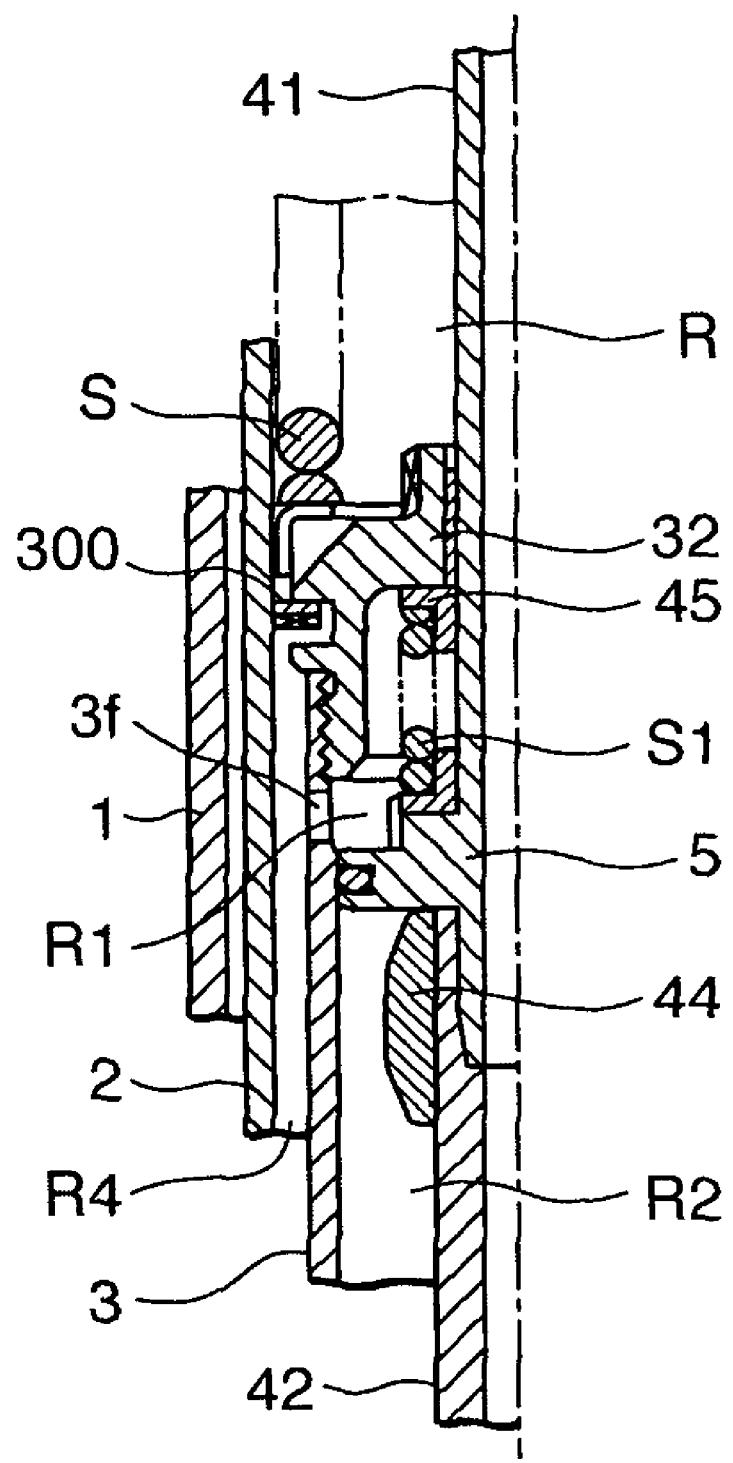
FIG. 12 is an enlarged longitudinal sectional view of a middle part of the front fork according to the fourth embodiment of this invention.

Referring to FIG. 12, the piston 5 is not provided with an orifice in this front fork. The axial length of the piston 5 can thereby be shortened.

The piston 5 comprises a stopper 45 supported resiliently from below by a free-end spring SI. The stopper 45 limits the displacement of the piston 5 in the elongation direction by contacting the rod guide 32. A bump cushion 44 is fitted on the lower side of the piston 5. The bump cushion 44 limits the displacement of the piston in the contraction direction by contacting the rod guide 33.

Referring again to FIG. 10, the lower end of the inner tube 34 is closed by a bottom cap 35. A small hole 35a is formed in the center of the bottom cap 35. The small hole 35a penetrates the bottom cap 35 and the bottom 21, and opens downwardly. The air chamber A1 communicates with the atmosphere via the small hole 35a. When the working oil in the front fork invades the air chamber A1, it leaks to the exterior of the bottom 21 via the small hole 35a. The small hole 35a is thus used to check if there is a leakage of working oil from the front fork.

In this front fork, the oil chamber R1 communicates permanently with the space R4 between the wheel-side tube 2 and the cylinder 3 via the communicating hole 3f, as in the case of the third embodiment. In the third embodiment, the orifice 6 and the check valve 7 are disposed between the reservoir R and the upper oil chamber R1, but in this embodiment, a valve 300 having the functions of both the orifice 6 and the check valve 7 of the third embodiment is disposed between the reservoir R and the space R4.

Figure 13:
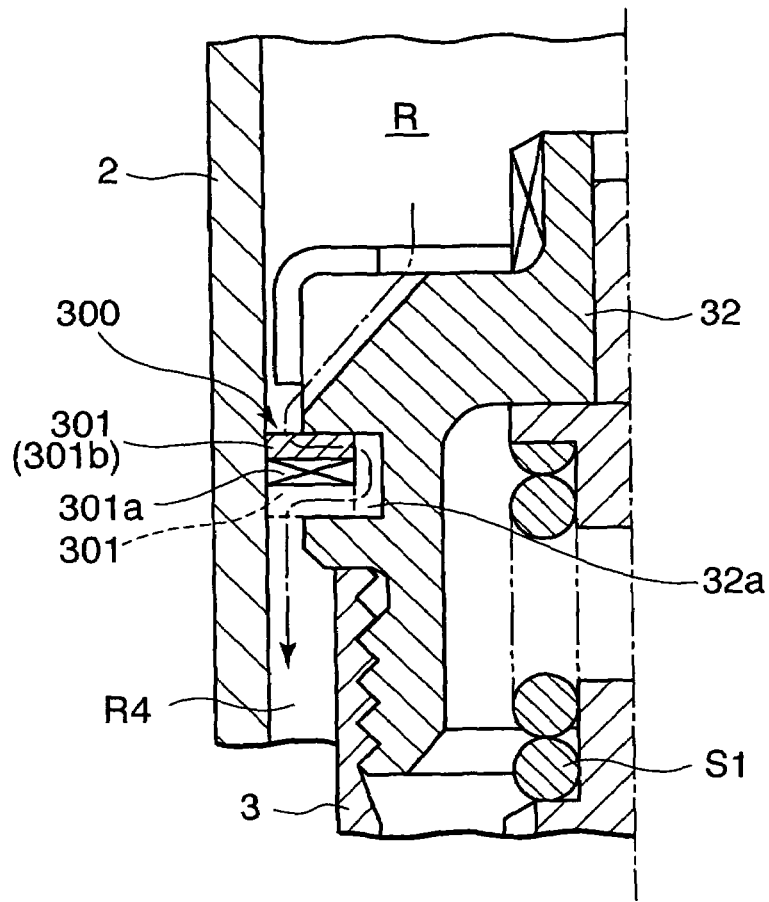
FIG. 13 is an enlarged longitudinal sectional view of a valve provided in the front fork according to the fourth embodiment of this invention.

Referring to FIGS. 12 and 13, the rod guide 32 is screwed into the inner periphery of the upper end of the cylinder 3. The outer periphery of the rod guide 32 enlarges in the radial direction above the cylinder 3 to form a large diameter part. A ring-shaped space is formed between this large diameter part and the inner periphery of the wheel-side tube 2. The valve 300 having the functions of the orifice 6 and the check valve 7 of the third embodiment is disposed in this gap.

Next, the construction of the valve 300 will be described.

A ring groove 32a opening radially outward is formed on the outer periphery of the rod guide 32. The valve 300 comprises a valve body 301 fitted into the ring groove 32a.

Figure 14:
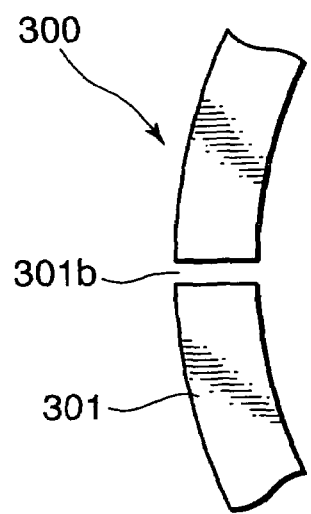
FIG. 14 is an enlarged plan view of essential parts of a valve body of the valve provided in the front fork according to the fourth embodiment of this invention.

Referring to FIG. 14, the valve body 301 is a ring-shaped member having a greater inner diameter than the diameter of the bottom of the ring groove 32a and an outer diameter that enables the valve body 301 to slide axially along the inner periphery of the wheel-side tube 2. A slit 301b is formed in the valve body 301. Further, plural notches 301 are formed on the lower side of the valve body 301. With respect to the flow of working oil in the radial direction, the cross-section of the passage that the notches 301a form is sufficiently larger than the cross-section of the passage which the slit 301b forms. The width of the ring groove 32a in the axial direction is set to be greater than the thickness of the valve body 301. The valve body 301 is thereby retained in the groove 32a such that it can be displaced axially within a range limited by the groove 32a.

Referring again to FIG. 13, the space R4 under the valve body 301 is maintained at an equal pressure to the upper oil chamber R1 via the communicating hole 3f. The valve body 301 displaces upwardly in the ring groove 32a until it contacts the upper wall of the ring groove 32a as shown by the solid line in the figure, when the pressure of the upper oil chamber R1 exceeds the pressure of the reservoir R. In this state, the space R4 under the valve body 301 and the reservoir R above the valve body 301 communicate only via the slit 301b. The flow resistance of the slit 301b is set to be greater than the flow resistance of the variable orifice 101 of the external damping mechanism V.

When the front fork elongates, working oil flows from the upper oil chamber R1 into the lower oil chamber R2 via the variable orifice 101 of the external damping mechanism V. At the same time, the working oil amount in the oil chambers R1 becomes surplus due to the difference in the diameters of the upper rod 41 and the lower rod 42 as described above. Working oil corresponding to the surplus flows from the upper oil chamber R1 into the reservoir R via the slit 301b of the valve 300. Since the flow resistance of the slit 301b is greater than the flow resistance of the variable orifice 101, the flow of working oil into the reservoir R causes the pressure in the upper oil chamber R1 to increase. In other words, the valve 300 in this situation carries out the function of the orifice 6 of the third embodiment. When the pressure in the upper oil chamber R1 increases, the pressure in the lower oil chamber R2 also increases. As long as the working oil pressure in the lower oil chamber R2 is maintained at a high level, air bubbles mixed into the working oil in the lower oil chamber R2 do not expansion.

When the front fork shifts from elongation to contraction, the pressure in the lower oil chamber R2 starts to increase and the pressure in the upper oil chamber R1 starts to decrease. However, since the air bubbles mixed into the working oil in the lower oil chamber R2 have not experienced expansion, these air bubbles do not undergo contraction when the pressure in the lower oil chamber R2 starts to increase. Accordingly, the working oil in the lower oil chamber R2 flows into the upper oil chamber R1 via the variable orifice 201 of the external damping mechanism V in good response to an increase in the pressure of the lower oil chamber R2. The external damping mechanism V thereby shifts the generated damping force from the elongation damping force to the contraction damping force without delay as the front fork shifts from elongation to contraction.

When the pressure in the upper oil chamber R1 decreases as the front fork undertakes contraction, the valve body 301 of the valve 300 moves downward in the ring groove 32a and contacts the lower wall of the ring groove 32a as shown by the dotted line in FIG. 13. In this state, there is a gap between the upper wall of the ring groove 32a and the valve body 301. The working oil in the reservoir R flows into the space R3 without resistance via this gap, the gap formed between the bottom of the ring groove 32a, and the radial passage which the notches 301 in the valve body 301 form, and is supplied to the upper oil chamber R1 via the communicating hole 3f. The valve 300 in this situation carries out the functions of the check valve 7 of the third embodiment. Accordingly, the upper oil chamber R1 does not fall into a negative pressure and the air bubbles mixed into the working oil in the upper oil chamber R1 do not expand. When the front fork shifts from contraction to elongation, therefore, a response delay due to contraction of the air bubbles does not occur when shifting the generated damping force.

Figure 15:
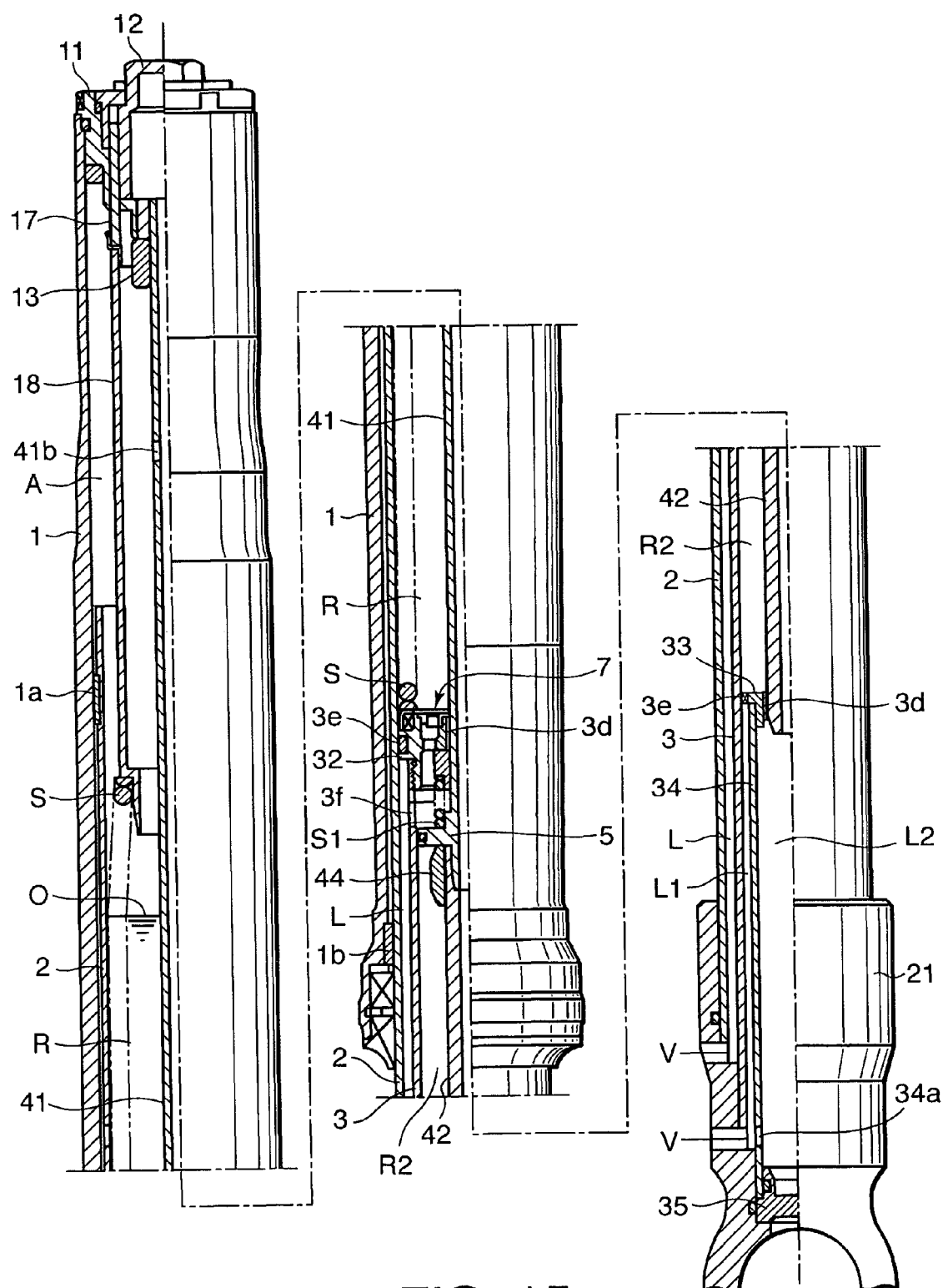
FIG. 15 is a detailed longitudinal sectional view and a side view of a front fork according to a fifth embodiment of this invention.
Figure 16:
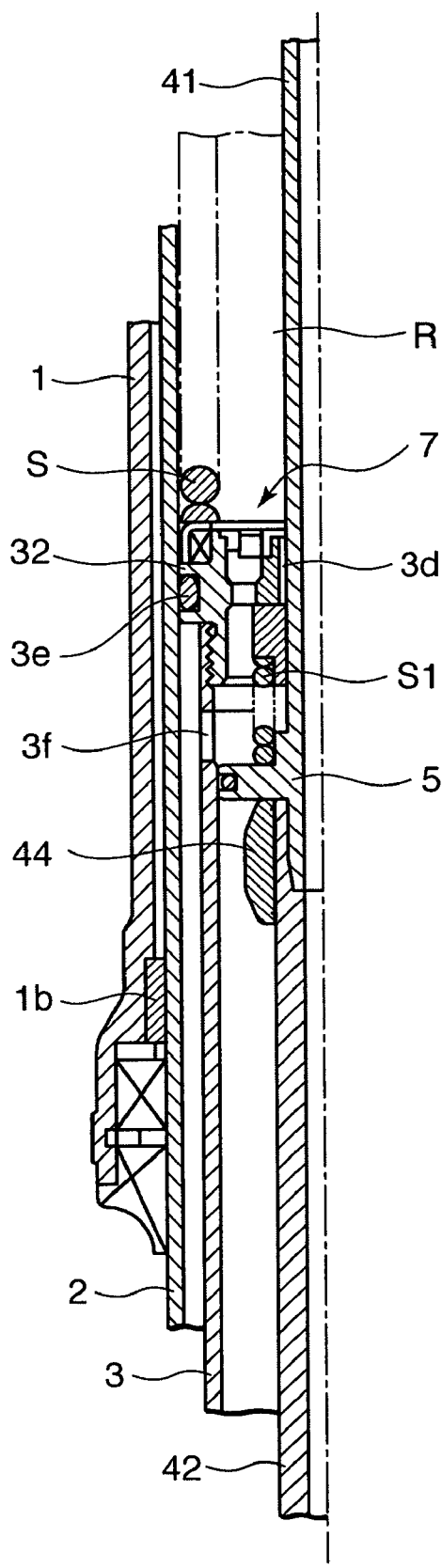
FIG. 16 is an enlarged longitudinal sectional view of a middle part of the front fork according to the fifth embodiment of this invention.
Figure 17:
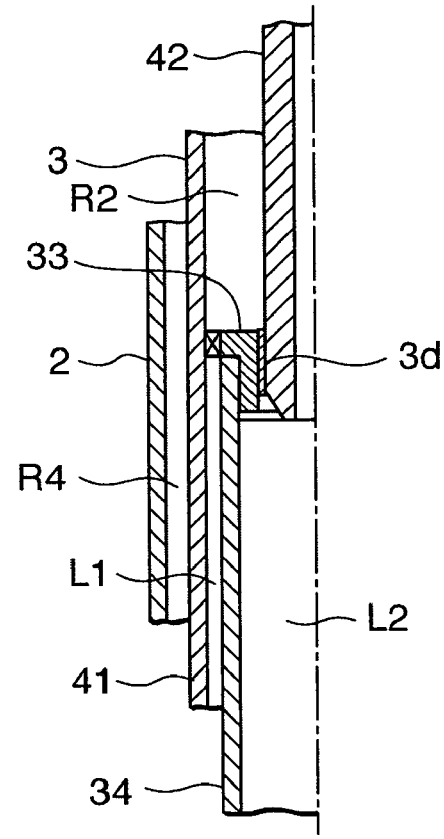
FIG. 17 is an enlarged longitudinal sectional view of a lower part of the front fork according to the fifth embodiment of this invention.

Referring to FIGS. 15-17 a fifth embodiment of this invention will be described.

The front fork according to this embodiment corresponds to the front fork according to the fourth embodiment with the addition of an oil chamber L2 in the inner tube 34 in place of the air chamber A1.

The oil chamber L2 is connected to the space L1 via a hole 34a formed in the lower portion of the inner tube 34.

The the plug 43 is omitted in this embodiment. A hole 41b that connects the reservoir R and the inner space of the upper rod 41 is formed in the upper part of the upper rod 41.

The check valve 7 is installed in the rod guide 32 as in the case of the second embodiment. An orifice not shown is also installed in the rod guide 32. The orifice functions as a passage which allows working oil to flow from the upper oil chamber R1 to the reservoir R while causing the pressure in the upper oil chamber R1 to increase when the upper oil chamber R1 decreases in size as the piston 5 strokes upward in the cylinder 3.

By thus forming the oil chamber L2 in the interior of the inner tube 34, the seal member 3e can be omitted. The oil chamber L2 is connected to the reservoir R via the inner space of the lower rod 42 and upper rod 41. Accordingly, when the front fork contracts, working oil flows from the oil chamber L2 which decreases in size due to invasion of the lower rod 42 into the reservoir R via the inner space of the lower rod 42 and the upper rod 41, thereby preventing the lower rod 42 invading the oil chamber L2 from being oil-locked.

The contents of Tokugan 2008-107415, with a filing date of Apr. 17, 2008 in Japan and Tokugan 2009-078619, with a filing date of Mar. 27, 2009 in Japan are hereby incorporated by reference.

Although the invention has been described above with reference to certain embodiments, the invention is not limited to the embodiments described above. Modifications and variations of the embodiments described above will occur to those skilled in the art, within the scope of the claims.

For example, in any of the embodiments described above, the upper rod 41 is formed to have a smaller diameter than the lower rod R2 such that the working oil in the upper oil chamber R1 flows into the reservoir R so as to increase the pressure in the upper oil chamber R1. However, the lower rod 42 may be formed to have a smaller diameter than the upper rod 41 such that the working oil in the lower oil chamber R2 flows into the reservoir R so as to increase the pressure in the lower oil chamber R2. Such a configuration is also within the scope of the invention.

As described above, since this invention comprises a passage which allows working oil to flow out from the double-rod damper D in accordance with working oil amount variation when it elongates or contracts while causing the pressure in the damper to increase, the damper D can maintain a high pressure as a whole. Therefore, air bubbles mixed into the working oil in the damper D are unlikely to expand, and hence a delay in the generation of damping force due to contraction of expanded air bubbles can be prevented. The response of the damping force that is generated by elongation/contraction of a front fork in which the double-rod damper D is incorporated is thereby enhanced, oscillation transmitted from a road surface to a motor cycle can be absorbed effectively, and the riding comfort of the motorcycle can be improved.

What is claimed is:

1. A front fork disposed between a frame and a front wheel of a motorcycle, comprising:
   a body-side tube connected to the frame so as to face downward;
   a wheel-side tube connected to the front wheel so as to face upward and fitted to the body-side tube so as to be free to slide relative thereto; and
   a double-rod damper comprising:
   a cylinder fixed within the wheel-side tube and filled with working oil;
   a piston accommodated in the cylinder so as to be free to slide axially;
   an upper rod fixed to an upper end of the piston, the upper rod projecting axially upward from the cylinder and connected to the body-side tube;
   a lower rod fixed to a bottom end of the piston and projecting axially downward from the cylinder into the wheel-side tube, the lower rod having a different diameter to the upper rod;
   an upper oil chamber formed by the piston in the cylinder around the upper rod;
   a lower oil chamber formed by the piston in the cylinder around the lower rod;
   a damping member that allows working oil to flow between the upper oil chamber and the lower oil chamber under a predetermined flow resistance;
   a reservoir of working oil disposed on the outside of the cylinder; and
   a passage that connects one of the upper oil chamber and the lower oil chamber formed around one of the upper rod and the lower rod that has a smaller diameter, to the reservoir, and causes a pressure in the one of the upper oil chamber and the lower oil chamber to increase when the piston displaces in the cylinder in a direction to cause a working oil amount in the cylinder to decrease.

2. The front fork as defined in claim 1, wherein a flow resistance of the passage is set to be greater than the predetermined flow resistance.

3. The front fork as defined in claim 1, wherein the passage comprises any one of an orifice and a relief valve.

4. The front fork as defined in claim 1, wherein the double-rod damper further comprises a check valve that is disposed in parallel with the passage and introduces working oil into the one of the upper oil chamber and the lower oil chamber from the reservoir when the piston displaces in the cylinder in a direction to cause the working oil amount in the cylinder to increase.

5. The front fork as defined in claim 1, wherein the upper rod has a smaller diameter than the lower rod and the one of the upper oil chamber and the lower oil chamber is the upper oil chamber.

6. The front fork as defined in claim 5, wherein the double-rod damper is installed in the wheel-side tube, the double-rod damper further comprises an upper partition that closes an upper end of the upper oil chamber while supporting the upper rod so as to be free to project upwardly from the upper partition, and the passage is formed through the upper partition.

7. The front fork as defined in claim 6, wherein the double-rod damper further comprises a lower partition that closes a lower end of the lower oil chamber while supporting the lower rod so as to be free to project downwardly from the lower partition.

8. The front fork as defined in claim 7, wherein the wheel-side tube comprises a bottom that also closes a lower end of the cylinder, and a space formed between the cylinder and the wheel-side tube and a space formed under the lower partition in the cylinder are connected to the reservoir.

9. The front fork as defined in claim 6, wherein the body-side tube comprises a cap member that closes an upper end of the body-side tube and the front fork further comprises a suspension spring that is disposed between the cap member and the upper partition.

10. The front fork as defined in claim 7, wherein the upper partition partitions the reservoir from a space under the upper partition in the wheel-side tube, the double-rod damper further comprises an inner tube disposed in the cylinder under the lower partition, the lower rod projecting from the lower partition into the interior of the inner tube, the wheel-side tube comprises a bottom that also closes a lower end of the cylinder and the inner tube, and a space formed between the cylinder and the wheel-side tube and a space formed between the inner tube and the cylinder form a part of a connecting passage that connects the upper oil chamber and the lower oil chamber via the damping member that is provided outside the front fork.

11. The front fork as defined in claim 10, wherein the damping member comprises a variable orifice.

12. The front fork as defined in claim 10, wherein the upper oil chamber and the space formed between the cylinder and the wheel-side tube are connected via a through-hole formed in a wall of the cylinder nearby the upper partition, and the lower oil chamber and the space formed between the inner tube and the cylinder are connected via a notch formed in the lower partition.

13. The front fork as defined in claim 1, wherein the damping member is disposed within the piston.

* * * * *